June 15, 1971 C. LENZ 3,585,045
METHOD AND APPARATUS FOR PREPARING BEER WORT
Filed May 2, 1967
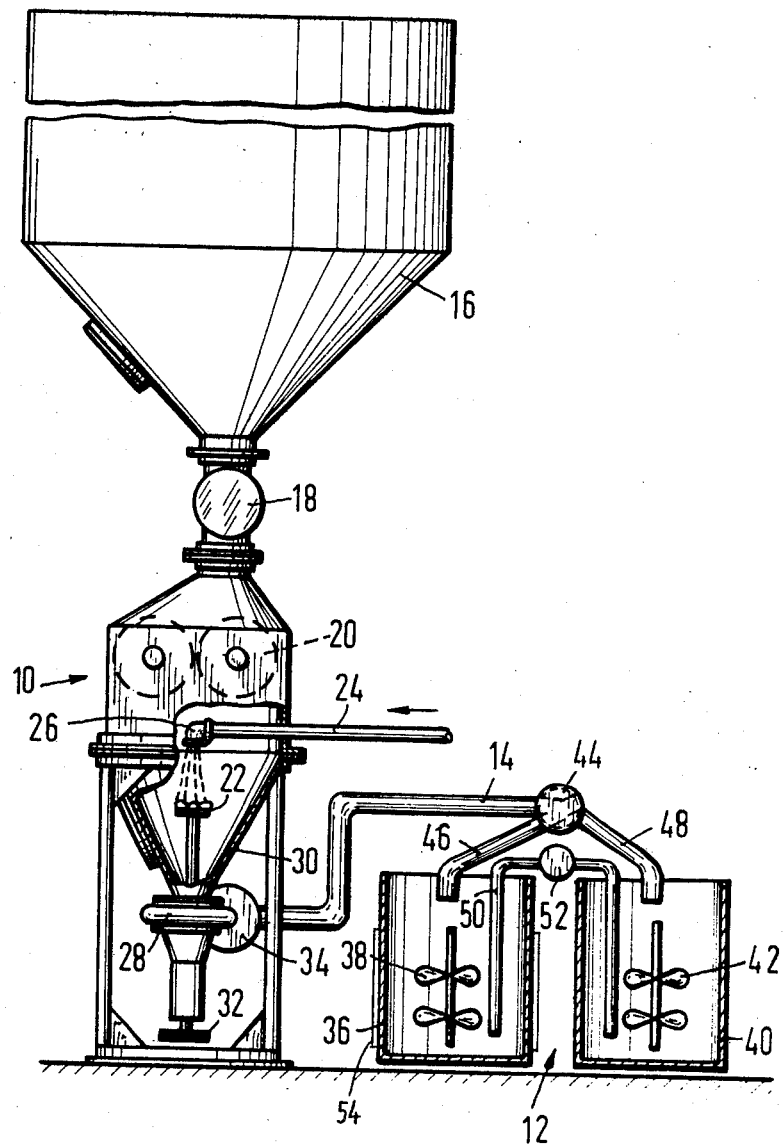
INVENTOR
Conrad Lenz
By: Low and Berman
Agents 3,585,045
METHOD FOR PREPARING BEER WORT
Conrad Lenz, 2 Annenhofstrasse,
805 Freising, Bavaria, Germany
Filed May 2, 1967, Ser. No. 635,570
Claims priority, application Germany, May 10, 1966,
L 53,553
Int. Cl. C12c
U.S. Cl. 99—52                                                    4 Claims

ABSTRACT OF THE DISCLOSURE

A continuous mash-making apparatus including a grist mill for wet crushing of malt and a device for suspending the crushed malt in water is connected with a brewing installation of at least two heatable vessels by a mash pipe equipped with a two-way valve which alternatively connects the two vessels with the container. During operation of the apparatus, a portion of the mesh is transferred from the mash-making apparatus first to one of the vessels, and the contents of the first vessel are being heated while another portion of the mash is being transferred to the second vessel for later mixing with the heated contents of the first vessel.

BACKGROUND OF THE INVENTION

This invention relates to beer brewing and brewing equipment, and particularly to a method of transferring mash from mash-making apparatus including a grist mill for wet crushing of malt to vessels in which the mash is being heated to convert it to wort.

Wort was prepared for many years by crushing dry malt, mixing the crushed malt with water in a tub to form a malt suspension or mash, pumping a portion of the mash into a second vessel for heating therein, and returning the heated portion to the bulk of the mash in the tub. Separation of portions of the mash, heating of the separated portions, and return thereof to the bulk of the mash was repeated so as gradually to raise the temperature of the mash. This complex heating procedure is necessary to avoid damage to heat-sensitive constituents of the mash by local overheating.

More recently, it was found more advantageous to prepare the mash in continuously operating equipment separate from the mash tub. The malt is crushed while wet, the crushed malt is mixed with water to form the mash, and the mash is discharged to the brewing apparatus in a continuous stream. Conventional procedures were employed heretofore in the subsequent operations, the mash stream being collected in a tub, and the contents of the tub being gradually heated by separating portions of the mash from the bulk thereof remaining in the tub, heatitng the separated portions, and returning the heated material to the tub.

At least some advantages of the more advanced wet milling techniques are lost by the conventional heating methods because the continuously prepared malt is further processed by a batch method. The present invention aims at shortening the wort-making process by adapting the mash heating process to the characteristics of the improved method of preparing mash in equipment separate from the mash tub.

SUMMARY OF THE INVENTION

According to the method of this invention, a first portion of the continuously prepared mash is transferred from a mash-making zone to a first vessel. A subsequent portion of the mash is transferred from the mash-making zone to a second vessel while the first portion is being heated in the first vessel, and the two portions are then combined, whereupon further heating may follow conventional practice of separating a portion of the mixture from the bulk of the same, heating the separated portion, returning the heated portion to the bulk of the mixture, and repeating such separating, heating, and returning until the mixture reaches the desired temperature.

The plant employed in performing the method is provided with a two-way valve in the mash transfer conduit which connects the mash-making apparatus with the mash heating or brewing apparatus. Two branch conduits lead from the valve to two vessels of the mash-heating apparatus, at least one vessel being provided with heating means. The valve may be moved in the usual manner between two positions in which it connects the mash transfer conduit with the branch conduits respectively while blocking the other branch conduit.

Other features and many of the attendant advantages of this invention will become apparent from the following detailed description of a preferred embodiment when considered in connection with the appended drawing.

BRIEF DESCRIPTION OF THE DRAWING

The sole figure of the drawing shows brewing equipment of the invention in elevation, and partly in section.

DESCRIPTION OF THE PREFERRED EMBODIMENT

The mash-making apparatus 10 of the illustrated plant is connected with a mash heating apparatus 12 by a mash transfer line 14.

The mash-making apparatus, more fully described in my copending application, Ser. No. 411,378, filed on Nov. 16, 1964, now Pat. No. 3,327,612 includes a malt bin 16 equipped with non-illustrated sprinklers for wetting the malt. The bin is mounted atop a grist mill 20, and is connected to the mill by a rotary feeder 18. Crushed wet malt drops from the mill into a downwardly tapering chute 30 in which it is mixed with additional water supplied by a water line 24 and discharged from the line 24 through a nozzle 26 against a rotary distributor plate 22 attached to the impeller of a centrifugal mash pump 28. The pump, whose intake is located at the bottom of the chute 30, has a drive pulley 32 connected to a non-illustrated prime mover in a conventional manner, and its discharge duct is connected to the mash line 14 by a flange 34.

The mash-heating apparatus 12 includes two vessels 36, 40 equipped with agitators 38, 42, the vessel 36 also being equipped with a heating jacket 54. The agitators are motor-driven in a conventional manner not shown, and the jackets 54, 56 are connected to a steam line or other source of heating fluid as is usual, and has not been shown.

A rotary two-way valve 44 is mounted on the end of the mash transfer conduit 14, and is provided with two branch conduits 46, 48 leading to the vessels 36, 40 respectively. In the illustrated position of the valve, the conduit 14 is connected with the branch conduit 46 while the branch conduit 48 is blocked. When the valve 44 is moved clockwise from the illustrated position, the mash transfer conduit 14 is connected with the branch conduit 48 while the branch conduit 46 is blocked.

A syphon 50 which connects the vessels 36, 40 is provided with a reversible mash pump 52 for pumping mash between the vessels 36, 40.

The afore-described apparatus is operated as follows:

Mash is initially transferred from the mash-making apparatus 10 to the vessel 36 of the mash-heating apparatus 12 in a continuous stream by the pump 28 through the transfer conduit 14, the valve 44, and the branch conduit 46, so that it by-passes the vessel 40. Without stopping the pump, the valve 44 is shifted to its second operating position in which it causes the stream of mash to flow into the vessel 40. Heating fluid is simultaneously admitted to the jacket 54 of the vessel 36. When the vessel 40 has received the desired amount of mash, the pump 28 is stopped or connected to another set of paired vessels in the mash-heating apparatus, not shown, but identical with the vessels 36, 40, where the staggered filling procedure described above may be repeated.

The heated portion of the mash is transferred from the vessel 36 to the vessel 40 through the syphon 50 by the pump 52, and is intimately mixed with the bulk of the mash in the vessel 40 by the agitator 42. Another portion of the mash is then pumped into the vessel 36 for further heating there in a conventional manner and for later return to the vessel 40, the agitator 38 being operated during each heating step to avoid local overheating.

The method of the invention saves time lost in an analogous conventional plant which lacks the valve 44 and the branch conduits 46, 48, and in which the mash transfer conduit leads directly into a vessel analogous to the vessel 40. The processing cycle of the invention is shortened by the time spent in the conventional plant for transferring a portion of the mash for a first heating from the main vessel to the actual heating vessel. The saving significantly contributes to the output rate of the plant.

While the invention has been described with particular reference to specific embodiments, it is to be understood that it is not limited thereto, but is to be construed broadly and restricted solely by the scope of the appended claims.

What is claimed is:

1. A method of making beer wort which comprises:
  (a) crushing wet malt and mixing the crushed malt with water to form a mash in a mash-making zone;
  (b) sequentially withdrawing a first portion and a second portion of said mash from said mash-making zone;
  (c) transferring said first portion from said zone to a first mash heating vessel;
  (d) thereafter transferring said second portion from said zone to a second mash heating vessel while by-passing said first vessel;
  (e) heating said first portion in said first vessel while said second portion is being transferred from said zone to said second mash heating vessel; and
  (f) mixing said first portion after the heating thereof with said second portion in said second vessel and thereby raising the temperature of the resulting mixture above the temperature of said second portion.

2. A method as set forth in claim 1, which further comprises separating a part of said resulting mixture from the bulk of said mixture in said second vessel by transferring said part to said first vessel, heating said part in said first vessel to a temperature higher than the temperature of said bulk, and mixing the heated part with said bulk.

3. A method as set forth in claim 1, wherein said first portion is transferred from said zone to said first vessel while by-passing the second vessel.

4. A method as set forth in claim 2, wherein said mash is withdrawn from said mash-making zone in a continuous stream, said first portion and said second portion constituting respective successive portions of said stream.

References Cited

UNITED STATES PATENTS

| | | | |
|---|---|---|---|
| 2,082,222 | 6/1937 | Siebel | 99—43 |
| 3,249,443 | 5/1966 | Reiter | 99—51 |
| 3,171,746 | 3/1965 | Shore | 99—51 |

LIONEL M. SHAPIRO, Primary Examiner

U.S. Cl. X.R.

99—51, 276, 278